United States Patent
Leisl, III et al.

(10) Patent No.: US 10,975,510 B1
(45) Date of Patent: Apr. 13, 2021

(54) CONSUMER APPLIANCE AND USER INTERFACE HAVING ONE OR MORE TOUCH SENSORS

(71) Applicant: Haier US Appliance Solutions, Inc., Wilmington, DE (US)

(72) Inventors: Donald James Leisl, III, Louisville, KY (US); Richard Gary Woodham, Jr., Taylorsville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/600,611

(22) Filed: Oct. 14, 2019

(51) Int. Cl.
  *G09F 13/06* (2006.01)
  *G09F 13/14* (2006.01)
  *D06F 34/28* (2020.01)
  *G06F 3/044* (2006.01)

(52) U.S. Cl.
  CPC .............. *D06F 34/28* (2020.02); *G06F 3/044* (2013.01)

(58) Field of Classification Search
  CPC combination set(s) only.
  See application file for complete search history.

(56) References Cited

U.S. PATENT DOCUMENTS

| | | | |
|---|---|---|---|
| 7,915,553 B2 | 3/2011 | Arione et al. | |
| 9,940,857 B2 | 4/2018 | Heater et al. | |
| 10,082,327 B2 | 9/2018 | Kim et al. | |
| 2016/0071443 A1* | 3/2016 | Heater | A47L 15/4293 362/23.13 |

* cited by examiner

*Primary Examiner* — Deeprose Subedi
(74) *Attorney, Agent, or Firm* — Dority & Manning, P.A.

(57) ABSTRACT

A consumer appliance, a provided herein, may include a cabinet and a user interface disposed on the cabinet. The user interface may include an external panel, a control board, a touch sensor, a reflector plate, and a light source. The external panel may include an outer surface facing outward and an inner surface positioned opposite from the outer surface. The control board may be positioned behind the external panel and include a forward surface facing the external panel and a rearward surface facing away from the external panel. The control board may define a light aperture extending therethrough. The touch sensor may be mounted on the control board and spaced apart from the forward surface. The reflector plate may be spaced rearward from the control board to define an open region. The light source may be mounted on the control board at the rearward surface and face rearward.

11 Claims, 3 Drawing Sheets

CONSUMER APPLIANCE AND USER INTERFACE HAVING ONE OR MORE TOUCH SENSORS

FIELD OF THE INVENTION

The present subject matter relates generally to consumer appliances, such as laundry or washing machine appliances, and more particularly to user interfaces for consumer appliances.

BACKGROUND OF THE INVENTION

Consumer appliances, such as washing machine appliances, dryer appliances, dishwashing appliances refrigerator appliances, oven appliances, microwave appliances, etc., generally include a user interface or control panel. Using the control panel, an appliance user can input control commands to the appliance and operate the appliance. Certain control panels include touch sensors, such as capacitive touch sensors, to detect an electrical field generated by a user's body to operate or engage the touch sensor. In particular, capacitive touch sensors can detect a change in capacitance when the user touches the control panel.

Touch sensors have various benefits. For example, touch sensors can assist with providing a clean appearance for an associated or corresponding consumer appliance. In particular, touch sensors are frequently positioned behind a dielectric panel on a rigid or semi-rigid printed circuit board, sometimes also referred to as a "PCB." A user touches an outer surface of the dielectric panel opposite the touch sensors to actuate the touch sensors. The smooth outer surface can have a pleasant cosmetic appearance or may be less prone to wear, especially particularly compared to tactile buttons, knobs, etc.

Often, it may be desirable to provide one or more lights or light sources to illuminate a portion of the user interface on or near to the surface that a user must touch in order to engage a particular touch sensor. Such light sources and illumination may provide feedback to a user or generally indicate the presence of a touch sensor.

In spite of these advantages, however, incorporating a touch sensor and a light source within a user interface can create various challenges (e.g., for assembly or manufacture). For instance, although it may be desirable to mount a touch sensor relatively close to the dielectric panel (e.g., in order to readily detect a user's electrical field), light sources must generally be held relatively far from the dielectric panel. The relatively far distance needed for light source may, for instance, be necessary in order to ensure adequate dispersion of light emissions (e.g., to one or more light guides) without bleeding to surrounding areas, which might cause confusion or detract from the overall appearance. Multiple separate control panels must often be provided for a touch sensor and a light source. In other instances, separate conductive elements must be mounted between a touch sensor and the dielectric panel in order to ensure that the touch sensor can be engaged. Such configurations may, however, increase the cost and difficulty of assembly for a user interface.

As a result, it would be desirable to provide a consumer appliance or user interface having one or more features for addressing the above challenges. In particular, it may be advantageous to provide a user interface with features for maintaining a touch sensor and light source in a mutually-desirable position on a common element.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a consumer appliance is provided. The consumer appliance may include a cabinet and a user interface disposed on the cabinet. The user interface may include an external panel, a control board, a touch sensor, a reflector plate, and a light source. The external panel may include an outer surface facing outward for user engagement therewith and an inner surface positioned opposite from the outer surface. The control board may be positioned behind the external panel. The control board may include a forward surface facing the external panel and a rearward surface facing away from the external panel. The control board may define a light aperture extending therethrough from the forward surface to the rearward surface. The touch sensor may be mounted on the control board. The touch sensor may be spaced apart from the forward surface. The reflector plate may be spaced rearward from the control board to define an open region from the rearward surface to the reflector plate. The light source may be mounted on the control board at the rearward surface. The light source may face rearward.

In another exemplary aspect of the present disclosure, a user interface for a consumer appliance is provided. The user interface may include an external panel, a control board, a touch sensor, a reflector plate, and a light source. The external panel may include an outer surface facing outward for user engagement therewith and an inner surface positioned opposite from the outer surface. The control board may be positioned behind the external panel. The control board may include a forward surface facing the external panel and a rearward surface facing away from the external panel. The control board may define a light aperture extending therethrough from the forward surface to the rearward surface. The touch sensor may be mounted on the control board. The touch sensor may be spaced apart from the forward surface. The reflector plate may be spaced rearward from the control board to define an open These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
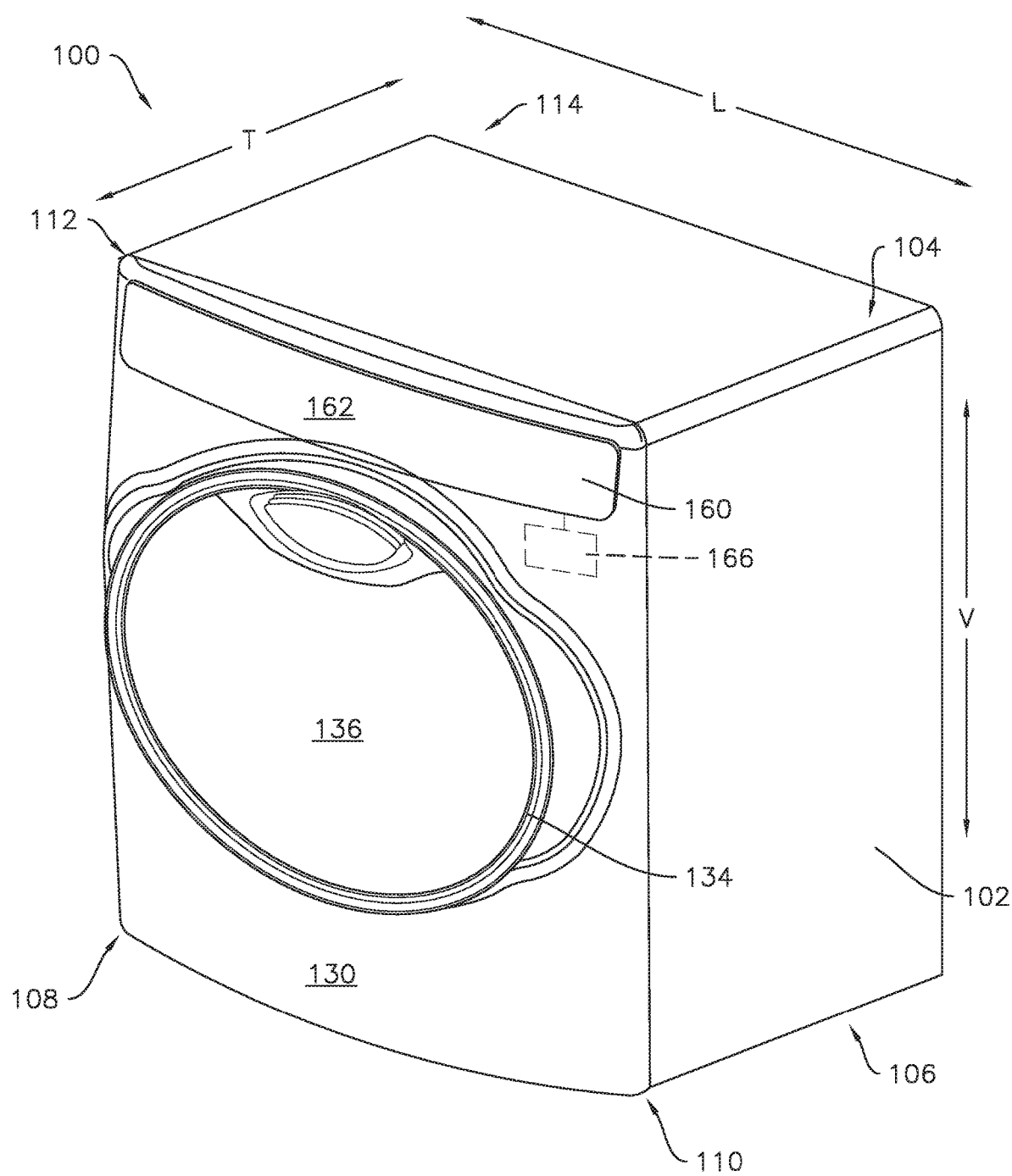
FIG. 1 provides a perspective view of a consumer appliance, illustrated as a washing machine appliance, according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, term "or" is generally intended to be inclusive (i.e., "A or B" is intended to mean "A or B or both"). The terms "first," "second," and "third" may be used interchangeably to distinguish one element from another and are not intended to signify location or importance of the individual elements.

Figure 2:
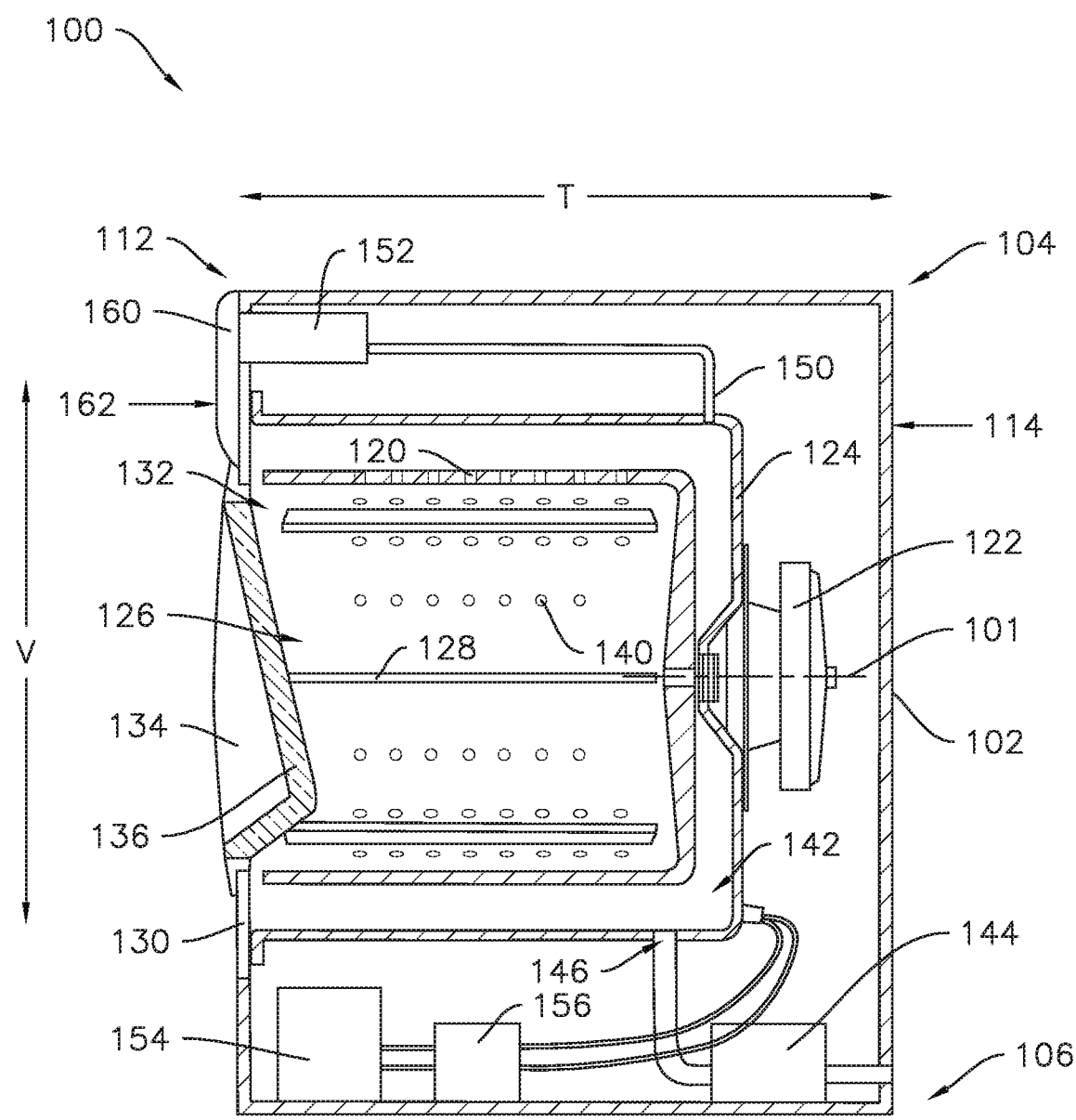
FIG. 2 provides a sectional view of the exemplary washing machine appliance of FIG. 1.

Turning now to the figures, FIG. 1 is a perspective view of an exemplary washing machine appliance 100 and FIG. 2 is a sectional side view of the washing machine appliance 100. As illustrated, washing machine appliance 100 generally defines a vertical direction V, a lateral direction L, and a transverse direction T, each of which is mutually perpendicular, such that an orthogonal coordinate system is defined. Washing machine appliance 100 includes a cabinet 102 that extends between a top 104 and a bottom 106 along the vertical direction V, between a left side 108 and a right side 110 along the lateral direction L, and between a front 112 and a rear 114 along the transverse direction T.

As illustrated, a wash tub 124 is mounted within cabinet 102. A wash basket 120 is received within the wash tub 124 and the wash basket 120 defines a wash chamber 126 that is configured for receipt of articles for washing. Wash basket 120 is rotatably mounted within cabinet 102, e.g., within wash tub 124, such that wash basket 120 is rotatable about an axis of rotation 101. A motor 122, e.g., such as a pancake motor, is in mechanical communication with wash basket 120 to selectively rotate wash basket 120 (e.g., during an agitation or a rinse cycle of washing machine appliance 100) about the axis 101. Optionally, the axis 101 may be oriented generally along or parallel to the transverse direction T of the washing machine appliance 100. Accordingly, the washing machine appliance 100 may be referred to as a front-load or horizontal axis washing machine.

The wash tub 124 holds wash and rinse fluids for agitation in wash basket 120 within wash tub 124. As used herein, "wash fluid" may refer to water, detergent, fabric softener, bleach, or any other suitable wash additive or combination thereof.

Wash basket 120 may define one or more agitator features that extend into wash chamber 126 to assist in agitation and cleaning of articles disposed within wash chamber 126 during operation of washing machine appliance 100. For example, a plurality of ribs 128 may extend from basket 120 into wash chamber 126. In this manner, for example, ribs 128 may lift articles disposed in wash basket 120 during rotation of wash basket 120.

In some embodiments, cabinet 102 also includes a front panel 130 which defines an opening 132 that permits user access to wash basket 120 within wash tub 124. More specifically, washing machine appliance 100 includes a door 134 that is positioned in front of opening 132 and is rotatably mounted to front panel 130. Door 134 is rotatable such that door 134 permits selective access to opening 132 by rotating between an open position (not shown) facilitating access to a wash tub 124 and a closed position (FIG. 1) prohibiting access to wash tub 124.

A window 136 in door 134 may permit viewing of wash basket 120 when door 134 is in the closed position (e.g., during operation of washing machine appliance 100). In certain embodiments, door 134 also includes a handle (not shown) that a user may pull when opening and closing door 134. Further, although door 134 is illustrated as mounted to front panel 130, it should be appreciated that door 134 may be mounted to another side of cabinet 102 or any other suitable support according to alternative embodiments.

In some embodiments, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140. A pump assembly 144 is located beneath tub 124 for gravity assisted flow when draining tub 124 (e.g., via a drain 146). Pump assembly 144 may be configured for recirculating wash fluid within wash tub 124.

In exemplary embodiments, a spout 150 is configured for directing a flow of fluid into wash tub 124. For example, spout 150 may be in fluid communication with a water supply (not shown) in order to direct fluid (e.g., clean water) into wash tub 124. Spout 150 may also be in fluid communication with the sump 142. For example, pump assembly 144 may direct wash fluid disposed in sump 142 to spout 150 in order to circulate wash fluid in wash tub 124.

In optional embodiments, a detergent drawer 152 is slidably mounted within front panel 130. Detergent drawer 152 receives a wash additive (e.g., detergent, fabric softener, bleach, or any other suitable liquid or powder) and directs the fluid additive to wash chamber 124 during operation of washing machine appliance 100. According to the illustrated embodiment, detergent drawer 152 may also be fluidly coupled to spout 150 to facilitate the complete and accurate dispensing of wash additive.

Additionally or alternatively, a bulk reservoir 154 may be disposed within cabinet 102. Bulk reservoir 154 is also configured for receipt of fluid additive for use during operation of washing machine appliance 100. Bulk reservoir 154 is sized such that a volume of fluid additive sufficient for a plurality or multitude of wash cycles of washing machine appliance 100 (e.g., five, ten, twenty, fifty, or any other suitable number of wash cycles) may fill bulk reservoir 154. Thus, for example, a user can fill bulk reservoir 154 with fluid additive and operate washing machine appliance 100 for a plurality of wash cycles without refilling bulk reservoir 154 with fluid additive. A reservoir pump 156 is configured for selective delivery of the fluid additive from bulk reservoir 154 to wash tub 124.

During operation of washing machine appliance 100, laundry items are loaded into wash basket 120 through opening 132. Wash tub 124 is filled with water, detergent, or other fluid additives (e.g., via spout 150 or detergent drawer 152). One or more valves (not shown) can be controlled by washing machine appliance 100 to provide for filling wash basket 120 to the appropriate level for the amount or volume of articles being washed or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle or after the rinse cycle in order to wring wash fluid from the articles being washed. During a spin cycle, basket 120 is rotated at relatively high speeds. After articles disposed in wash basket 120 are cleaned or washed, the user can remove the articles from wash basket 120 (e.g., by opening door 134 and reaching into wash basket 120 through opening 132).

In certain embodiments, a control panel 160 is disposed on the cabinet 102, such as at front panel 130. Generally, control panel 160 defines an outer surface 162 extending from a first end 172 to a second end 174 (e.g., along the lateral direction L). The control panel 160 and outer surface 162 may be part of a user interface 200 (FIG. 3) for operator selection of machine cycles and features. For instance, the control panel 160 may be used as part of a user interface 200 to allow for the selective activation, adjustment, or control of the washing machine appliance 100. In such embodiments, the control panel 160 may include or be provided as an external panel (e.g., dielectric panel) of the user interface 200 whereby the user interface 200 registers touches on the outer surface 162. The user interface 200 may also provide for the selective activation, adjustment, or control of any timer features or other user-adjustable inputs. One or more of a variety of electrical, mechanical or electromechanical input devices including rotary dials, push buttons, toggle/rocker switches, or touch pads can also be used singularly or in combination with touch input components. Control panel 160 may also include a display component, such as a digital or analog display device designed to provide operational feedback to a user.

Thus, user interface 200 is in operative communication with one or more components of washing machine appliance 100 (e.g., via the controller 166) to generally direct or interact with washing machine appliance 100.

Also, although described with respect to washing machine appliance 100, it should be readily understood that, in particular, a user interface 200 (FIG. 3) as described herein could be used with any suitable consumer appliance, such as a refrigerator appliance, an oven appliance, a microwave appliance, a dishwasher appliance, a dryer appliance, at least a portion of such appliances may be constructed of plastics, ceramics, or combinations thereof. In some embodiments, a touch screen may be incorporated into or may form the control panel of an appliance; for example, the touch screen may be incorporated into a backsplash of an oven appliance or dryer appliance.

Figure 3:
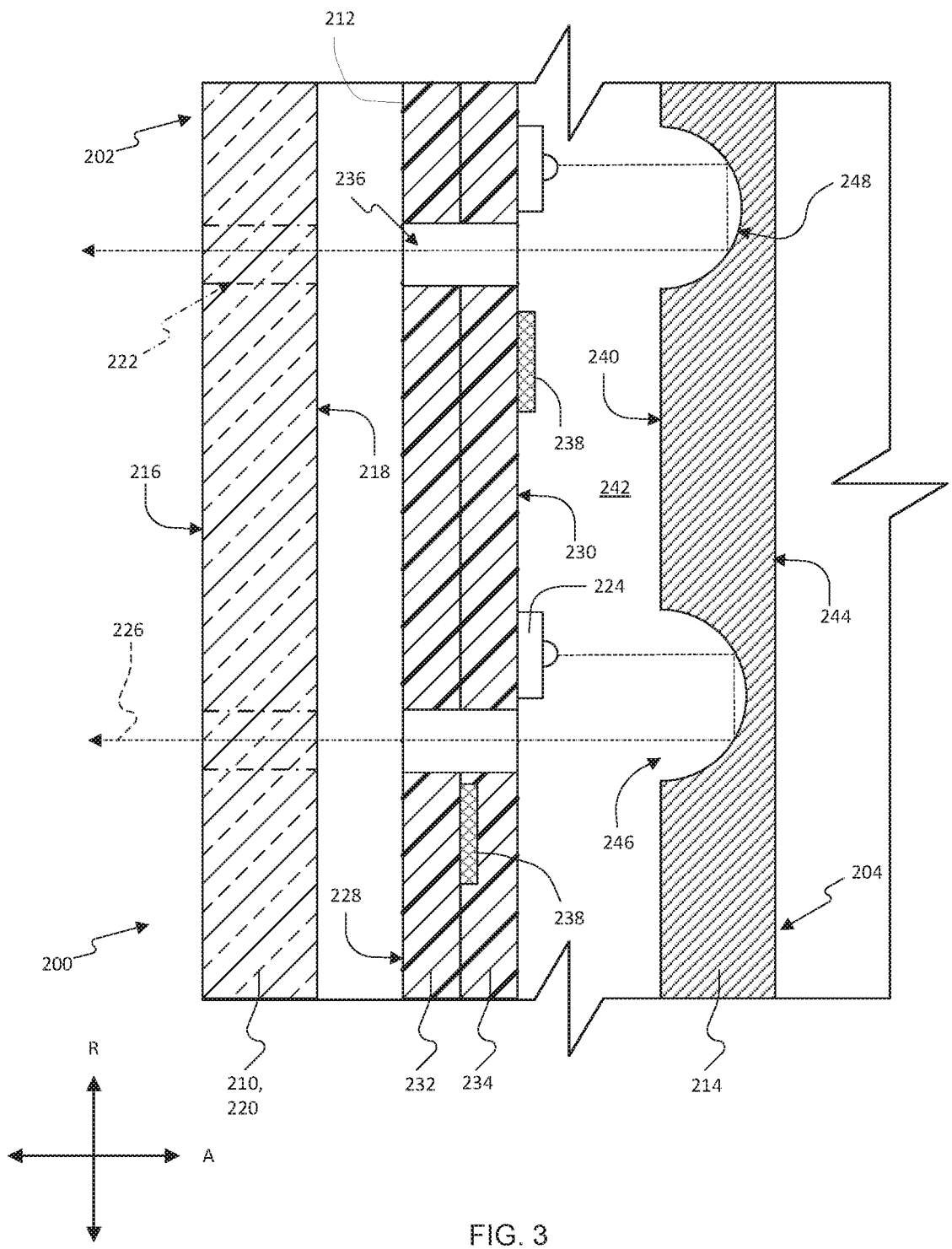
FIG. 3 provides a sectional view of a portion of a user interface for a consumer appliance according to exemplary embodiments of the present disclosure.

Operation of washing machine appliance 100 can be regulated by a controller 166 that is operatively coupled (i.e., in operable communication with) user interface 200 (FIG. 3). By way of example, the controller 166 may include a memory and one or more processing devices such as microprocessors, CPUs or the like, such as general or special purpose microprocessors operable to execute programming instructions or micro-control code associated with operation of appliance 100. The memory may represent random access memory such as DRAM, or read only memory such as ROM or FLASH. The memory may be a separate component from the processor or may be included onboard within the processor. In some embodiments, the processor executes programming instructions stored in memory.

The controller 166 may be positioned in a variety of locations throughout washing machine appliance 100. For example, the controller 166 may be located under or next to the control panel 160. In some embodiments, input/output ("I/O") signals are routed between the controller 166 and various operational components of appliance 100 such as control panel 160, sensors, graphical displays, or one or more alarms. In one embodiment, the control panel 160 may represent a general purpose I/O ("GPIO") device or functional block. Control panel 160 may be in communication with the controller 166 via one or more signal lines or shared communication busses. A user of washing machine appliance 100 may input and receive information regarding the operation of washing machine appliance 100 at control panel 160. A variety of text, digits, or symbols may be printed on control panel 160. In some embodiments, no text, digits, or symbols may appear on control panel 160 unless washing machine appliance 100 is in use.

Turning especially to FIG. 3, a sectional view of a portion of user interface 200 is provided according to exemplary embodiments of the present disclosure. As shown, user interface 200 generally defines an axial direction A extending from a front end 202 of user interface 200 to a back end 204 of a user interface 200. For example, front end 202 may be disposed at the front portion 112 (FIG. 1) of washing machine appliance 100 (e.g., to receive a user's touch or input) while back end 204 is disposed within cabinet 102 (e.g., and is generally inaccessible to a user during operation of washing machine appliance 100). In some such embodiments, front end 202 is positioned forward from the back end 204 along the transverse direction T (FIG. 1). Optionally, the axial direction A is perpendicular to the lateral direction L (e.g., parallel to the transverse direction T or vertical direction V) (FIG. 1). In addition to the axial direction A, user interface 200 generally defines a radial direction R perpendicular to the axial direction A.

As shown, user interface 200 includes multiple stacked layers or panels. Specifically, an external panel 210 (e.g., as or as part of control panel 160—FIG. 1), a control board 212, and a reflector panel 214 are stacked together along the axial direction A. As would be understood, one or more mechanical fasteners (e.g., bolts, nuts, brackets, etc.), adhesives, solders, or combinations thereof may join the stacked layers together or otherwise hold the same in a fixed position relative to each other. Moreover, at least a portion of the control board 212 and the reflector panel 214 may be generally disposed between the first end 172 and second end 174 of external panel 210 (FIG. 1). In turn, at least a portion of external panel 210, control board 212, and reflector panel 214 may each be aligned with each other along the axial direction A and radial direction R.

As noted above, external panel 210 includes an outer surface 216. When assembled, outer surface 216 faces outward in order for a user to engage or contact external panel 210 at outer surface 216. Outer surface 216 can define an exterior or outermost surface of the user interface 200 along the axial direction A (e.g., at front end 202). Opposite from the outer surface 216 (e.g., relative to the axial direction A), external panel 210 includes an inner surface 218. For instance, inner surface 218 may face or otherwise be directed toward an inner volume of cabinet 102. Additionally or alternatively, inner surface 218 may face the control board 212.

In certain embodiments, at least a portion of external panel 210 is formed from one or more suitable dielectric and solid or nonpermeable material, such as a plastic material (e.g., acrylic, polycarbonate, etc.) or ceramic material (e.g., glass or glass-ceramic). In optional embodiments, the external panel 210 includes a light permissive (e.g., transparent or translucent) pane 220. The light permissive pane 220 may define a solid light passage 222 of nonpermeable material to permit one or more light emissions 226 from a light source 224 mounted behind external panel 210. Thus, at least a portion of light emissions 226 that are directed from the light source 224 may be transmitted through solid light passage 222 (e.g., into the ambient area in front of the user interface 200).

Behind the external panel 210, a control board 212 is positioned (e.g., within the cabinet 102—FIG. 2). Generally, control board 212 provides a printed circuit board ("PCB") onto which one or more electrical components and electrical circuit paths may be provided. In some embodiments, control board 212 is provided as or as part of controller 166.

When assembled, a forward surface 228 of control board 212 may face forward toward the external panel 210. A rearward surface 230 of control board 212 (e.g., opposite from the forward surface 228 relative to the axial direction A) may face away from the external panel 210. For instance, the rearward surface 230 may be directed toward the reflector panel 214.

Optionally, multiple stacked boards 232, 234 (e.g., multiple single-sided PCBs) may be held together between the forward surface 228 and the rearward surface 230 (e.g., by a suitable fastener, adhesive, etc.). Alternatively, control board 212 may be provided a single-sided PCB defining both forward surface 228 and rearward surface 230.

Between the forward surface 228 and the rearward surface 230, the control board 212 defines a light aperture 236. Generally, light aperture 236 is axially aligned with the solid light passage 222 such that light emissions 226 may be directed through the control board 212 and to the external panel 210.

It is noted that although FIG. 3 illustrates control board 212 as being axially spaced apart from external panel 210, alternative embodiments may provide control board 212 (e.g., at the forward surface 228) in contact with the internal surface of the external panel 210.

On the control board 212, one or more touch sensors 238 are mounted. Thus, the touch sensor 238 is supported on a portion the control board 212. Specifically, the touch sensor or sensors 238 is/are spaced apart from the forward surface 228. In certain embodiments, a touch sensor 238 is mounted on the rearward surface 230 of the control board 212. In additional or alternative embodiments, a touch sensor 238 is mounted between the forward surface 228 and the rearward surface 230. For example, a touch sensor 238 may be mounted on the rear-facing surface of an individual stacked board (e.g., 232) that is disposed forward from another individual stacked board (e.g., 234). The region between the external panel 210 and the forward surface 228 of control board 212 may be free of any touch sensor 238.

Along with being mounted to control board 212, the touch sensor 238 may be operably coupled to control board 212 or controller 166 (e.g., to receive a user's input and accordingly direct or control operations of washing machine appliance 100—FIG. 1). The touch sensor 238 may be provided as any suitable sensor for detecting an electrical field generated by a user's body and detectable through a rigid dielectric panel. For instance, the touch sensor 238 may be a capacitive sensor to detect variation in capacitance, as would be understood. Separate from or in addition to the touch sensor 238, one or more light sources 224 are mounted on control board 212. In particular, a light source 224 is mounted at (e.g., supported on) the rearward surface 230 of control board 212. In some embodiments, at light source 224 may be spaced apart from a corresponding light aperture 236 (e.g., radially spaced apart along the radial direction R). When assembled, the light source 224 faces rearward (e.g., relative to the axial direction A). In particular the light source 224 is directed toward at least a portion of the reflector panel 214.

Light source 224 may be provided as any suitable electrical light source 224, such as a light-emitting diode (LED), fluorescent bulb, halogen bulb, etc. Moreover, light source 224 may be operably coupled (e.g., electrically coupled) to control board 212 or controller 166 (FIG. 2). Activation or illumination of light source 224 may be generally controlled by control board 212 or controller 166 (e.g., to indicate a user input, state of the appliance, state of a wash cycle, or any other relevant information to a user).

Spaced apart from at least a portion of the control board 212 and light source 224 (e.g., relative to the axial direction A), the reflector panel 214 is disposed within the user interface 200. Specifically, the reflector panel 214 is spaced rearward from the control board 212 such that an open region or opening 242 is defined (e.g., along the axial direction A). Generally, the reflector panel 214 includes a forward-reflecting surface 240 and an opposite back surface 244 (e.g., at the back end 204). Thus, the opening 242 may be defined along the axial direction A between the rearward surface 230 and the forward-reflecting surface 240. In particular, the opening 242 may be free of any obstruction or intervening member, for instance, between the forward-reflecting surface 240 and the light aperture 236.

The forward-reflecting surface 240 may be formed from or include any suitable light-reflecting material. Optionally, forward-reflecting surface 240 may provide a flat white or mirror surface to redirect light emissions 226 forward toward external panel 210.

Generally, at least a portion of the reflector panel 214 (e.g., a recess 246 at the forward-reflecting surface 240) is axially aligned with the light aperture 236. During use, the light source 224 may project or direct a light emission 226 to the forward-reflecting surface 240, which in turn redirects at least a portion of the light emission 226 forward through the light aperture 236.

In some embodiments, the forward-reflecting surface 240 is defined as a flat or planar member. In alternative embodiments, such as those shown in FIG. 3, the forward-reflecting surface 240 defines one or more recesses 246 (e.g., rearward-extending groove) facing the control board 212. The recess 246 may be in the line of emission for a corresponding light source 224 such that light emissions 226 are received (and reflected) at the recess 246. Optionally, multiple recesses 246 may be provided. Each recess 246 may correspond to a unique light source 224 or aperture 236. Additionally or alternatively, the recess 246 may define a semi-spherical concave profile 248 (e.g., perpendicular to the axial direction A), as shown. During use, a light source 224 may transmit a light emission to a corresponding recess 246, which in turn, redirects the light emission 226 to a corresponding aperture 236 and through a solid light passage 226.

Although an exemplary appliance is described in the context of washing machine 100, the exemplary embodiments of washing machine 100 are merely illustrative and non-limiting examples. As is understood, the present disclosure may include or be applied to any suitable appliance, such as a refrigerator appliance, an oven appliance, a microwave appliance, a dishwasher appliance, a dryer appliance, or another style/model of washing machine appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A consumer appliance comprising:
    a cabinet; and
    a user interface disposed on the cabinet, the user interface comprising
        an external panel comprising an outer surface facing outward for user engagement therewith and an inner surface positioned opposite from the outer surface,
        a control board positioned behind the external panel, the control board comprising a forward surface facing the external panel and a rearward surface facing away from the external panel, the control board defining a plurality of light apertures extending therethrough from the forward surface to the rearward surface,
        a touch sensor mounted on the control board, the touch sensor being spaced apart from the forward surface and rearward therefrom on the rearward surface,
        a reflector plate spaced rearward from the control board to define an open region from the rearward surface to the reflector plate, and
        a plurality of light sources mounted on the control board at the rearward surface, the plurality of light sources facing rearward,
    wherein the reflector plate defines a plurality of recesses, each recess of the plurality of recesses corresponding to a discrete light source of the plurality of light sources and a discrete light aperture of the plurality of light apertures, each recess of the plurality of recesses facing the control board to receive a light emission from the corresponding light source, and
    wherein each light source is of the plurality of light sources corresponds to a discrete light aperture of the plurality of light apertures and is radially spaced apart from the corresponding light aperture.

2. The consumer appliance of claim 1, wherein the external panel comprises a light-permissive pane.

3. The consumer appliance of claim 1, wherein the touch sensor is a capacitive sensor.

4. The consumer appliance of claim 1, wherein the reflector plate is axially aligned with the plurality of light apertures.

5. The consumer appliance of claim 1, wherein the recess defines a semi-spherical concave profile.

6. A user interface for a consumer appliance, the user interface comprising:
    an external panel comprising an outer surface facing outward for user engagement therewith and an inner surface positioned opposite from the outer surface;
    a control board positioned behind the external panel, the control board comprising a forward surface facing the external panel and a rearward surface facing away from the external panel, the control board defining a plurality of light apertures extending therethrough from the forward surface to the rearward surface;
    a touch sensor mounted on the control board, the touch sensor being spaced apart from the forward surface and rearward therefrom on the rearward surface;
    a reflector plate spaced rearward from the control board to define an open region from the rearward surface to the reflector plate; and
    a plurality of light sources mounted on the control board at the rearward surface, the plurality of light sources facing rearward,
    wherein the reflector plate defines a plurality of recesses, each recess of the plurality of recesses corresponding to a discrete light source of the plurality of light sources and a discrete light aperture of the plurality of light apertures, each recess of the plurality of recesses facing the control board to receive a light emission from the corresponding light source, and
    wherein each light source is of the plurality of light sources corresponds to a discrete light aperture of the plurality of light apertures and is radially spaced apart from the corresponding light aperture.

7. The user interface of claim 6, wherein the external panel comprises a light-permissive pane.

8. The user interface of claim 6, wherein the touch sensor is a capacitive sensor.

9. The user interface of claim 6, wherein the reflector plate is axially aligned with the plurality of light apertures.

10. The user interface of claim 6, wherein the recess defines a semi-spherical concave profile.

11. A consumer appliance comprising:
    a cabinet; and
    a user interface disposed on the cabinet, the user interface comprising
        an external panel comprising an outer surface facing outward for user engagement therewith and an inner surface positioned opposite from the outer surface,
        a dielectric control board positioned behind the external panel, the dielectric control board comprising a forward surface facing the external panel and a rearward surface facing away from the external panel, the dielectric control board defining a plurality of light apertures extending therethrough from the forward surface to the rearward surface,
        a capacitive touch sensor mounted on the dielectric control board, the capacitive touch sensor being spaced apart from the forward surface and directly mounted at the rearward surface,
        a reflector plate spaced rearward from the dielectric control board to define an open region from the rearward surface to the reflector plate, and
        a plurality of light sources mounted on the dielectric control board at the rearward surface, the plurality of light sources facing rearward,
    wherein the reflector plate defines a plurality of recesses, each recess of the plurality of recesses corresponding to a discrete light source of the plurality of light sources and a discrete light aperture of the plurality of light apertures, each recess of the plurality of recesses facing the dielectric control board to receive a light emission from the corresponding light source, and
    wherein each light source is of the plurality of light sources corresponds to a discrete light aperture of the plurality of light apertures and is radially spaced apart from the corresponding light aperture.

* * * * *